(12) United States Patent
Stephens

(10) Patent No.: US 9,719,725 B2
(45) Date of Patent: Aug. 1, 2017

(54) HEAT TREATMENT ROLLER HEARTH FURNACE DRIVE SYSTEM

(71) Applicant: Caterpillar Inc., Peoria, IL (US)

(72) Inventor: Mark Stephens, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 432 days.

(21) Appl. No.: 14/511,653

(22) Filed: Oct. 10, 2014

(65) Prior Publication Data

US 2016/0102915 A1 Apr. 14, 2016

(51) Int. Cl.
*B65G 13/06* (2006.01)
*F27B 9/24* (2006.01)

(52) U.S. Cl.
CPC ............ *F27B 9/2407* (2013.01); *B65G 13/06* (2013.01)

(58) Field of Classification Search
CPC ........ B65G 13/06; B65G 13/07; B65G 23/28; B65G 23/30; F27B 9/243; F27B 2009/2446
USPC .......................... 198/781.01–781.11, 832, 835
See application file for complete search history.

(56) References Cited

U.S. PATENT DOCUMENTS

| 2,842,352 | A | * | 7/1958 | Tauber | C21D 9/0018 266/132 |
| 3,254,778 | A | * | 6/1966 | Marland | C21D 9/0018 198/579 |
| 3,801,243 | A | * | 4/1974 | Smith | B29C 67/249 19/302 |
| 4,133,667 | A | * | 1/1979 | Nitschke | B65G 13/071 198/790 |
| 4,356,900 | A | * | 11/1982 | Sommer | F16D 25/14 192/103 R |
| 4,564,380 | A | * | 1/1986 | Fecik | B65G 13/07 198/790 |
| 4,620,628 | A | * | 11/1986 | Greenlee | B65G 13/07 198/781.1 |
| 4,802,845 | A | * | 2/1989 | Kajiura | F27B 9/2407 432/236 |
| 5,088,920 | A | * | 2/1992 | Reunamaki | B65G 23/16 432/236 |
| 5,244,081 | A | * | 9/1993 | Kajii | B65G 13/07 198/781.03 |

FOREIGN PATENT DOCUMENTS

| CN | 102002576 A | 4/2011 |
| CN | 201808878 U | 4/2011 |

* cited by examiner

*Primary Examiner* — James R Bidwell
(74) *Attorney, Agent, or Firm* — Miller, Matthias & Hull

(57) ABSTRACT

A drive system for a roller conveyor is described. The drive system may comprise a motor and a driving loop driven by the motor and having a driving side and a return side. The drive system may further comprise a first reducer configured to drive a rotation of the driving loop in a forward direction, a second reducer configured to drive the rotation of the driving loop in a reverse direction, and at least one sprocket driven by the driving side of the driving loop. The at least one sprocket may be configured to drive a rotation of at least one roller of the roller conveyor in the forward direction when the driving loop is rotating in the forward direction, and in the reverse direction when the driving loop is rotating in the reverse direction.

16 Claims, 4 Drawing Sheets

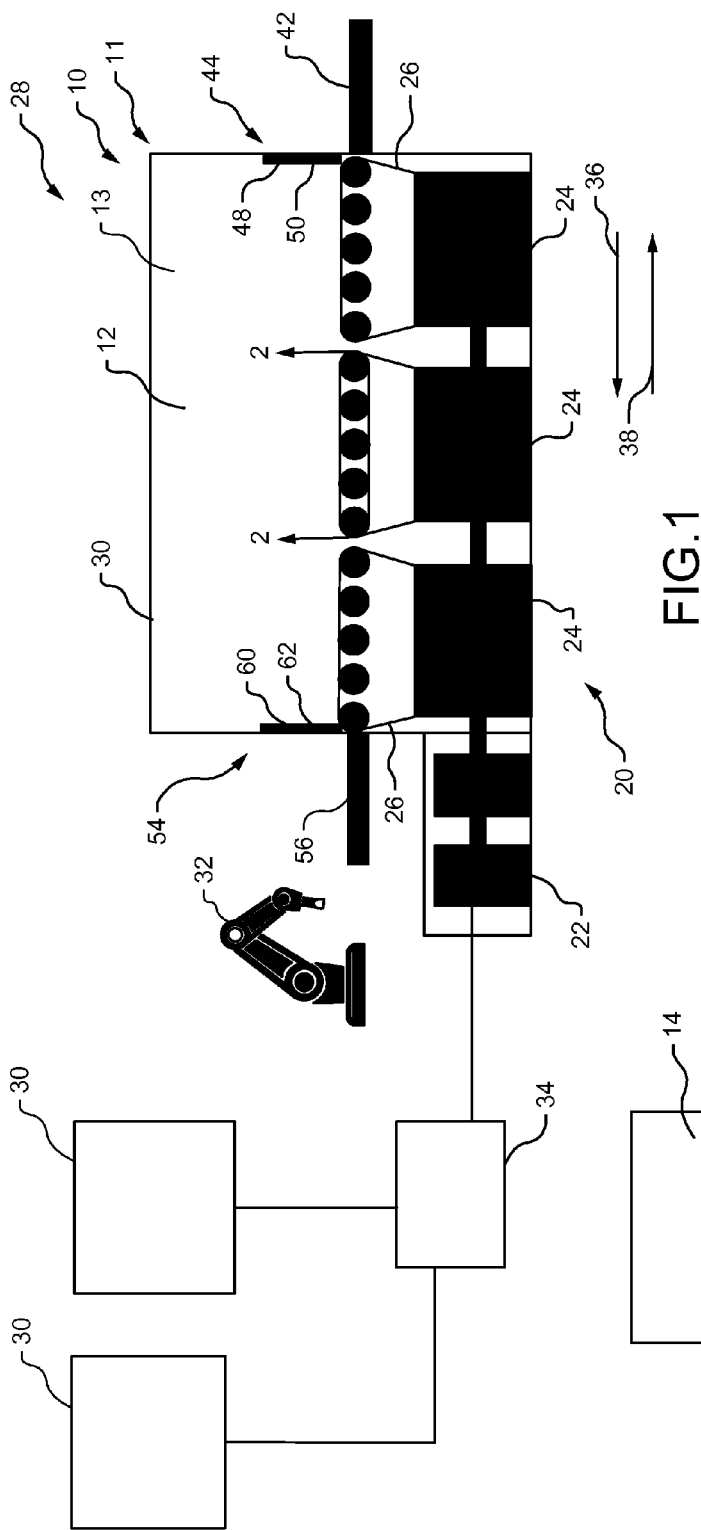

HEAT TREATMENT ROLLER HEARTH FURNACE DRIVE SYSTEM

FIELD OF THE DISCLOSURE

The present disclosure generally relates to roller hearth furnaces and, more specifically, relates to drive systems for driving roller hearth furnace rollers in oscillation.

BACKGROUND

A heat treatment roller hearth furnace is a roller conveyor system for heat treating parts on roller conveyors. For example, heat treatment roller hearth furnaces may be used to harden metallic industrial parts by heating the parts at elevated temperatures. A heat treatment roller hearth furnace may include a plurality of rollers which convey the parts, usually at a slow speed, through one or more temperature zones defined by one or more heating chambers of the furnace. The parts may be placed directly on the rollers or in carrier trays, and the treated parts may be collected at a discharge end of the furnace. The drive systems of roller hearth furnaces may include a motor to drive one or more drive sections, with each drive section driving the rotation of a group of rollers. Current drive section designs for roller hearth furnaces may include a single motor-driven gear reducer which drives the rotation of a chain loop which may, in turn, drive the rotation of the rollers.

With the increasing implementation of automated systems in industrial processes, many heat treatment roller hearth furnaces may be incorporated into an automation cell which may include one or more additional processing stations. For example, the automation cell may include a heat treatment station in which the parts are heated in a roller hearth furnace, a quenching station in which the parts are cooled, and a temper station in which the parts are conveyed through a lower temperature temper furnace to relieve stresses in the parts caused by the heating and/or quenching steps. At each station, the treated parts may be collected by one or more robots and carried to a subsequent station in the automation cell. Each of the stations and the robots of the automation cell may be controlled by a programmable logic controller (PLC). If a piece of equipment breaks at a downstream station or at a robot downstream of the roller hearth furnace station, the PLC may prevent the discharge of treated parts from the roller hearth furnace until the downstream equipment is fixed. Rather than stopping the rotation of the rollers of the roller hearth furnace, the PLC may initiate the drive sections to oscillate the rollers back and forth between the forward and reverse directions in order to prevent heat-induced sagging of the rollers or other heat-induced roller distortion which could occur if the rollers are left idle inside of the high temperature environment of the furnace.

The use of roller hearth furnaces in automation cells has spawned the need for driving the rollers in oscillation, as the conveyance of parts through roller hearth furnaces in automation cells is dependent on the flow of parts through other downstream stations. However, roller oscillation may require the gear reducer to drive or pull through the "slack" side (or loose side) of the chain loop when shifting from the forward to reverse directions. Depending on the degree of chain slack, the chain loop may turn for a variable amount of time before the chain loop is tight and begins driving the rotation of the rollers in the reverse direction. The variable amount of chain slack may cause the system to lose accurate tracking of part positions in the furnace, and this may cause part collisions or even furnace crashes and system downtime during periods of oscillation.

Accordingly, there is a need for improved drive systems for roller oscillation in roller hearth furnaces which reduce or prevent part mis-positioning during oscillation events. U.S. Pat. No. 5,088,990 describes the use of idler gears which mesh with external teeth of secondary drive loops to maintain tensioning of the drive loops and allow uniform reversal of the conveyor rolls as the driving direction reverses. While effective, improved systems for driving the rollers of roller hearth furnaces in oscillation are still wanting. The present disclosure addresses these problems.

SUMMARY OF THE DISCLOSURE

In accordance with one aspect of the present disclosure, a drive system for a roller conveyor is disclosed. The drive system may comprise a motor and a driving loop driven by the motor and having a driving side and a return side. The drive system may further comprise a first reducer configured to drive a rotation of the driving loop in a forward direction, a second reducer configured to drive a rotation of the driving loop in a reverse direction, and at least one sprocket driven by the driving side of the driving loop and configured to drive a rotation of at least one roller of the roller conveyor in the forward direction when the driving loop is rotating in the forward direction, and in the reverse direction when the driving loop is rotating in the reverse direction.

In accordance with another aspect of the present disclosure, a roller hearth furnace for heating parts is disclosed. The roller hearth furnace may comprise a furnace having a housing defining a heating chamber, and a plurality of rollers configured to convey the parts through the heating chamber. The roller hearth furnace may further comprise a drive system which may comprise a motor and a driving loop driven by the motor and having a driving side and a return side. The drive system may further comprise a first reducer configured to drive a rotation of the driving loop in a forward direction, a second reducer configured to drive a rotation of the driving loop in a reverse direction, and at least one sprocket driven by the driving side of the driving loop. The at least one sprocket may be configured to drive a rotation of at least one roller of the roller hearth furnace in the forward direction when the driving loop is rotating in the forward direction, and in the reverse direction when the driving loop is rotating in the reverse direction.

In accordance with another aspect of the present disclosure, a method for driving an oscillation of rollers of a roller conveyor back and forth between a forward direction and a reverse direction is disclosed. The method may comprise providing a drive system including a motor, a driving loop driven by the motor and having a driving side and a return side, and a first reducer and a second reducer on opposite sides of the driving side. The method may further comprise oscillating an input shaft back and forth between a first direction and a second direction using the motor, rotating the driving loop in the forward direction with the first reducer when the input shaft is rotating in the first direction, and rotating the driving loop in the reverse direction with the second reducer when the input shaft is rotating in the second direction. The method may further comprise driving an oscillation of the rollers with the driving loop, with the rollers rotating in the forward direction when the driving loop is rotating in the forward direction, and with the rollers rotating in the reverse direction when the driving loop is rotating in the reverse direction.

These and other aspects and features of the present disclosure will be more readily understood when read in conjunction with the accompanying drawings.

BRIEF DESCRIPTION OF THE DRAWINGS

FIG. 1 is a schematic view of a heat treatment roller hearth furnace as part of an automation cell, in accordance with the present disclosure.

FIG. 2 is a cross-sectional view of the roller hearth furnace of FIG. 1 taken along the line 2-2 of FIG. 1, depicting a heating chamber of the roller hearth furnace, constructed in accordance with the present disclosure.

Figure 3:
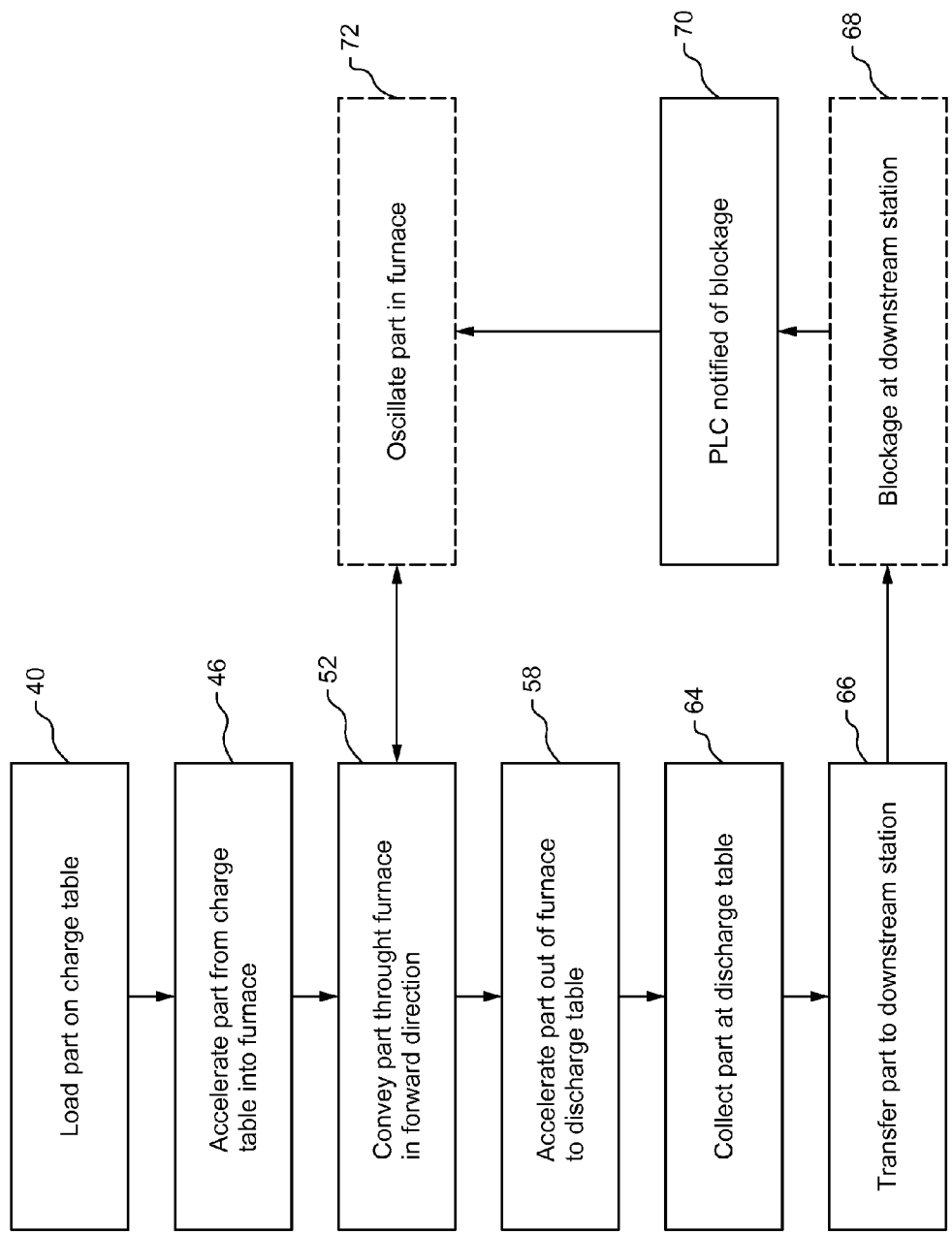
FIG. 3 is a flow chart illustrating a sample sequence of steps which may be involved in conveying parts through the roller hearth furnace and in initiating an oscillation of the rollers of the roller hearth furnace, in accordance with a method of the present disclosure.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use with heat treatment roller hearth furnaces or with heat treatment roller hearth furnaces in automation cells. Hence, although the present disclosure is, for convenience of explanation, depicted and described as certain illustrative embodiments, it will be appreciated that it can be implemented in various other types of embodiments and in various other systems and environments.

DETAILED DESCRIPTION

Referring now to the drawings, and with specific reference to FIGS. 1 and 2, a roller conveyor 10 is shown. As a non-limiting possibility, the roller conveyor 10 may be a heat treatment roller hearth furnace 11, although it may be other types of roller conveyor systems as well. If the roller conveyor 10 is a heat treatment roller hearth furnace 11, it may include a a furnace 12 having a housing 13 which may define one or more internal heating chambers 14 for heating parts 16 conveyed through the furnace 12 on rotating rollers 18 (see FIG. 2). The parts 16 may sit directly on the rollers 18 as they are conveyed through the roller hearth furnace 11, or they may be carried in trays or other holders through the furnace 11. For example, the roller hearth furnace 11 may be used to harden metallic parts (e.g., gears, chain links, etc.) by heat treatment. Alternatively, the roller hearth furnace 11 may be used for other heating applications such as, but not limited to, part tempering or stress relieving, annealing, curing, or solution treating applications. The rollers 18 of the roller hearth furnace 11 may be long enough to extend through the sides of the housing 13, where the rotation of the rollers 18 may be driven by a drive system 20, although the drive system 20 may be inside of the housing 13 in some circumstances as well. In any event, the drive system 20 may generally include a motor 22 and one or more drive sections 24 for driving a group of rollers 18 via a driving loop 26 such as a chain loop (see further details below).

The roller hearth furnace 11 may be part of an automation cell 28 which may include a plurality of stations 30, with the roller hearth furnace 11 being one of the stations 30. One or more robots 32 may collect and transfer the parts 16 between the stations 30. For example, the parts 16 may be heat treated in the roller hearth furnace 11 and then collected and transferred to one or more downstream stations 30 using the robot(s) 32. The downstream stations 30 may include a variety of stations such as, but not limited to, a quenching station at which the parts 16 are cooled, a temper furnace at which the parts 16 are treated at a lower temperature to relieve internal stresses caused by the heating or quenching treatments, and/or a container in which the treated parts are collected. The operation of the stations 30 and the robot(s) 32 may be controlled by a programmable logic controller (PLC) 34 which may be in electronic communication with each of the stations 30 and robots 32, as shown. It will be understood that the PLC 34 may control the drive system 20 of the roller hearth furnace 11 as well.

In response to a blockage at a downstream station 30 or at one of the robots 32, the PLC 34 may send a command to the drive system 20 to oscillate the rollers 18 back and forth between a forward direction 36 and a reverse direction 38 in order to prevent heat-induced sagging or distortion of the rollers 18 if left stationary inside of the heating chamber 14 (see FIG. 2). A blockage may occur, for example, due to a broken or defective piece of equipment at one of the stations 30 or at one of the robots 32 which disrupts the steady forward flow of the parts 16 through the automation cell 28. As explained in further detail below, the design of the drive system 20 of the present disclosure avoids driving through the slack side (i.e., loose side) of the driving loop 26 when shifting to the reverse direction 38 during an oscillation event so as to avoid any resulting part mis-positioning and/or system crashes. It is in this regard that the present disclosure improves over the prior art.

Turning now to FIG. 3, a series of steps which may be involved in conveying parts through the roller hearth furnace 11 and in initiating the oscillation of the rollers 18 is shown. According to a first block 40, the parts 16 may be manually or robotically loaded onto a charge table 42 of the roller hearth furnace 11 which may be located near a charge end 44 of the furnace (also see FIG. 1). The charge table 42 may include rollers for transferring the parts 16 into the furnace 11 and it may be driven by the drive system 20 and/or a separate drive system to allow for roller rotation at higher speeds. According to a next block 46, the parts 16 may then be accelerated from the charge table 42 into the heating chamber(s) 14 of the furnace at a relatively high speed using the rollers of the charge table 42. The parts 16 may enter the furnace 11 through a furnace inlet 48 which may include a door 50 that may open to allow the parts 16 into the furnace 11. Once inside of the furnace 11, the parts 16 may be conveyed through the heating chamber(s) 14 in the forward direction 36 by the rotation of the rollers 18, according to a next block 52. In general, the rollers 18 may rotate at slow speeds (i.e., less than 1 rotation per minute) to drive the parts 16 slowly through the heating chamber(s) 14 to allow sufficient time for heat treatment, although faster or slower roller rotation speeds may also be used in some circumstances. Once the parts 16 reach a discharge end 54 of the furnace 11, they may be accelerated out of the furnace 11 and onto a discharge table 56 at a relatively high speed according to a next block 58 (also see FIG. 1). More specifically, the parts 16 may exit the furnace 11 through a furnace outlet 60 which may include a door 62 that may open to allow the parts out of the furnace. The discharge table 56 may include rollers for conveying the parts 16 out of the furnace 11 and may be driven by the drive system 20 and/or a separate drive system to allow for operation at higher speeds (not shown). The heat treated parts may then be collected at the discharge table 56 by the robot 32 and transferred to a downstream station 30, according to a block 64 and a block 66, respectively.

In normal operation, the drive system 20 may rotate the rollers 18 in the forward direction 36 to continually convey the parts 16 from the charge end 44 to the discharge end 54 at a slow speed. However, if there is a blockage at a downstream station 30 or robot 32 (block 68), the blocked downstream station 30 or robot 32 may notify the PLC 34 of the blockage according to a block 70. In response, the PLC 34 will then send a command to the drive system 20 to initiate the oscillation of the rollers 18 back and forth between the forward direction 36 and the reverse direction 38 according to a next block 72. Once the downstream station 30 or robot 32 is repaired, the PLC 34 will be notified and may send a command to the drive system 20 to drive the rollers 18 in the forward direction 36 again.

Figure 4:
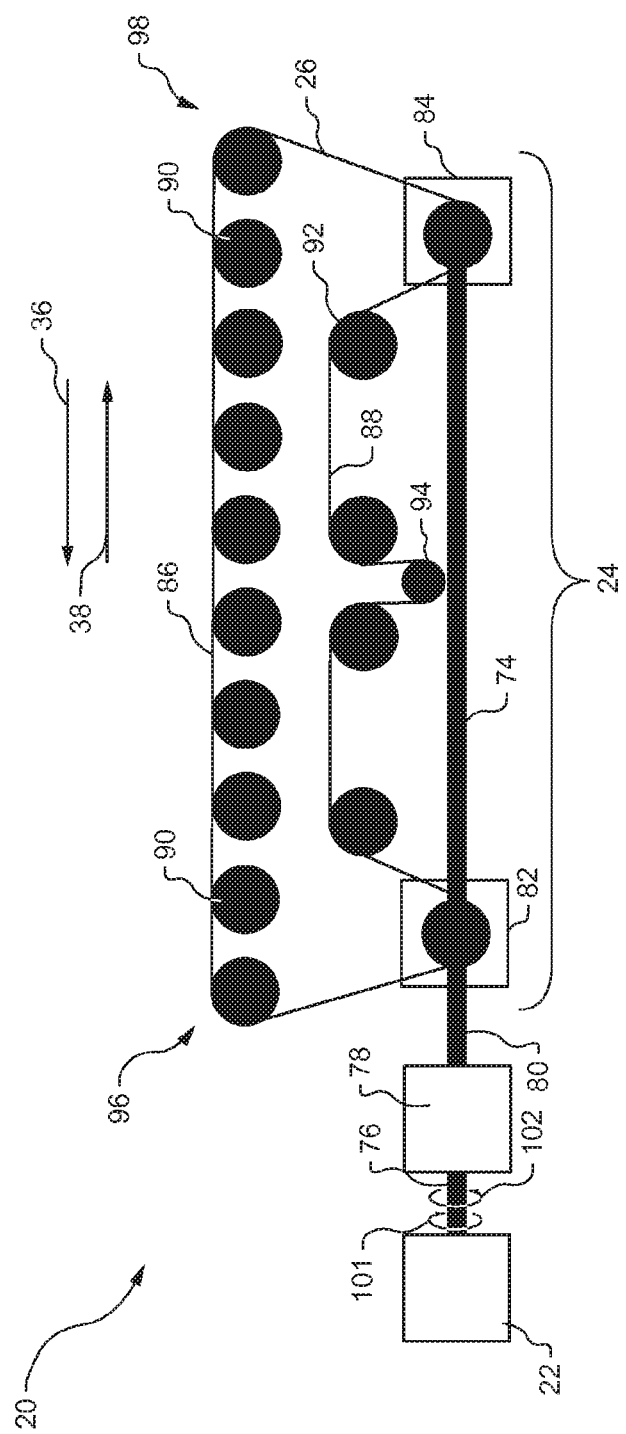
FIG. 4 is side view of a drive section of a drive system of the roller hearth furnace of FIG. 1, constructed in accordance with the present disclosure.

Turning now to FIG. 4, the drive system 20 of the roller hearth furnace 11 with a single drive section 24 is shown. It will be understood that the drive system 20 may include a plurality of drive sections 24, with each drive section 24 driving the rotation of a group of the rollers 18. If the drive system 20 includes a plurality of drive sections, all of the drive sections 24 may be driven by the same motor 22 as all may be operatively coupled to a same line shaft 74. In operation, the motor 22 may drive the rotation of the input shaft 76 at a high first rotation speed such as between about 1700 rpm to about 3600 rpm, although higher or lower rotation speeds may also apply in some cases. The input shaft 76 may then drive a main reducer 78 which may be a gear reducer that may reduce the first rotation speed down to a second rotation speed at an output shaft 80, with the second rotation speed of the output shaft 80 being substantially lower than the first rotation speed of the input shaft 76. The output shaft 80 may then drive the rotation of a first reducer 82 and a second reducer 84 of the drive section 24, as shown. The first reducer 82 and the second reducer 84 may be matching gear boxes that may drive the rotation of the driving loop 26 at a third rotation speed which may be equal to or lower than the second rotation speed of the output shaft 80.

The driving loop 26 may include a driving side 86 and a return side 88, with the driving side 86 driving a plurality of sprockets 90. Each of the sprockets 90 may then, in turn, drive the rotation of the rollers 18 as each of the sprockets 90 may be coupled to one of the rollers 18. The return side 88 may be the slack side (i.e., the loose side) of the driving loop 26 and may drive the rotation of one or more return sprockets 92, as shown. The return side 88 may also include a tensioner 94 which may assist in tensioning and taking up some of the slack of the return side 88.

The first reducer 82 may be located near a forward end 96 of the driving side 86 and between the driving side 86 and the return side 88. In addition, the second reducer 84 may be located near a back end 98 of the driving side 86 and between the driving side 86 and the return side 88. The first reducer 82 may drive the rotation of the driving loop 26 in the forward direction 36 by pulling the driving loop 26 from the forward end 96. During an oscillation event when rotation in the reverse direction 38 is required, the second reducer 84 may drive the rotation of the driving loop 26 in the reverse direction 38 by pulling the driving loop 26 from the back end 98. Thus, the drive system 20 of the present disclosure uses two reducers to permit driving from both the forward end 96 and the back end 98 of the driving side 86 of the driving loop 26. This driving mechanism ensures that the portion of the driving loop 26 extending from the first reducer 82 and across the driving side 86 to the second reducer 84 maintains continuous tension and that the slack of the driving loop 26 is localized on the return side 88 between the first reducer 82 and the second reducer 84. Accordingly, the drive system 20 disclosed herein avoids driving through the slack side of the driving loop 26 when reversing to the reverse direction 38, thereby maintaining accurate part tracking during oscillation events and preventing part collisions. This is in contrast with roller hearth furnace driving systems of the prior art which may rely on a single reducer to drive the rotation of driving loops in both the forward and reverse directions during oscillation and, therefore, must drive through the slack side of the driving loop.

Figure 5:
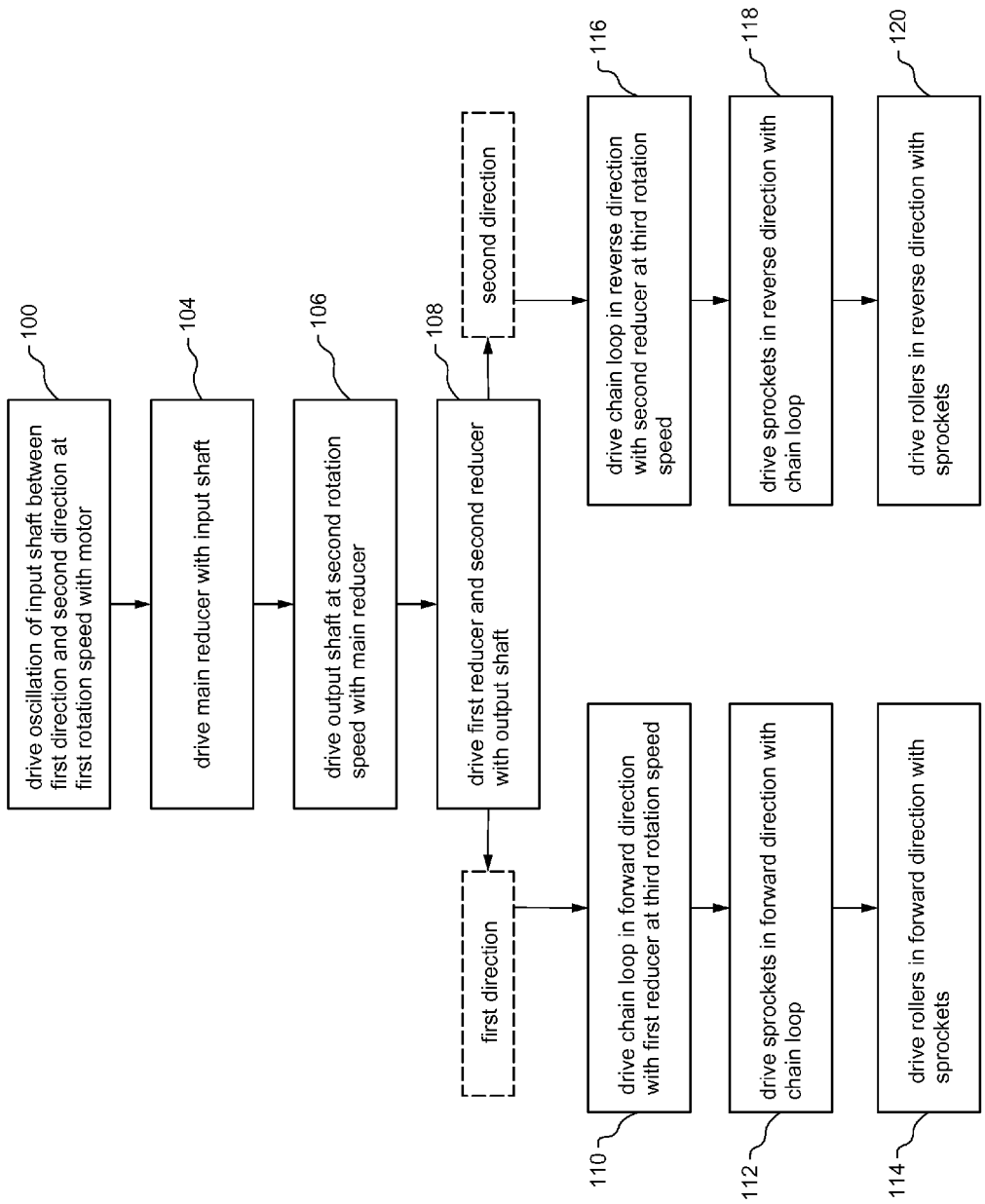
FIG. 5 is a flow chart illustrating a sample sequence of steps which may be involved in driving the oscillation of the rollers of the roller hearth furnace using the drive section of FIG. 4, in accordance with a method of the present disclosure.

FIG. 5 shows a sequence of steps which may be involved in using the drive system 20 of the present disclosure to drive the rollers 18 in oscillation. Beginning with a first block 100, the motor 22 may drive the rotation of the input shaft 76 in oscillation between a first direction 101 and a second direction 102 at the first rotation speed in which the first direction 101 and the second direction 102 are opposite directions (i.e., clockwise and counterclockwise) and either of which may be clockwise (see FIG. 4). The input shaft 76 may then drive the main reducer 78 (block 104) which may then, in turn, drive the rotation of the output shaft 80 in oscillation between the first direction 101 and the second direction 102 at the second rotation speed that is lower than the first rotation speed (block 106). The output shaft 80 may then drive the first reducer 82 and the second reducer 84, according to a next block 108.

When the output shaft 80 is rotating in the first direction 101 (which may be clockwise or counterclockwise) during the oscillation, the first reducer 82 may drive the rotation of the driving loop 26 in the forward direction 36 at the third rotation speed according to a block 110. The driving loop 26 may then drive the rotation of the sprockets 90 in the forward direction 36, and the sprockets 90 may then, in turn, drive the rotation of the rollers 18 in the forward direction 36 according to a block 112 and a block 114, respectively. In contrast, when the output shaft 80 is rotating in the second direction 102 (which may be clockwise or counterclockwise) during the oscillation, the second reducer 84 may drive the rotation of the driving loop 26 in the reverse direction 38 at the third rotation speed (block 116). The driving loop 26 may then drive the rotation of the sprockets 90 in the reverse direction 38 (block 118), and the sprockets 90 may then drive the rotation of the rollers 18 in the reverse direction 38 (block 120). In this way, the oscillation of the input shaft 76 between the first direction 101 and the second direction 102 may control the oscillation of the rollers 18.

Although the teachings of the present disclosure are focused on the use of the drive system with roller hearth furnaces in automation cells, it will be understood that the drive system disclosed herein may be applicable to stand-alone roller hearth furnaces that are not part of an automation cell, or other types of machines operating in roller oscillation.

INDUSTRIAL APPLICABILITY

The teachings of the present disclosure may find industrial applicability in a variety of settings such as, but not limited to, roller conveyor drive systems. The roller conveyor drive system of the present disclosure includes two matching gear reducers at opposite ends of the driving side of the driving loop in order to drive from both ends of the driving side. In this way, the driving loop maintains continuous tension on the driving side, and the slack is localized on the return side of the driving loop. Thus, the drive system of the present disclosure avoids driving through the slack side of the driving loop when shifting the rotation direction to the reverse direction during oscillation events. Consequently, the drive system disclosed herein assists in maintaining part position tracking during roller oscillation and avoids the part mis-positioning problems that occur during the oscillation of single reducer drive systems of the prior art. Roller hearth furnaces incorporating the drive system of the present disclosure may be used to heat treat a variety of parts such as, but not limited to, gears, chain links, and other metallic industrial parts. It is expected that the technology disclosed herein may find industrial applicability in a range of areas, including roller conveyor systems operating in oscillation, such as roller hearth furnaces operating in automation cells.

What is claimed is:

1. A drive system for a roller conveyor, comprising:
   a motor;
   a driving loop driven by the motor and having a driving side and a return side;
   a first reducer configured to drive a rotation of the driving loop in a forward direction;
   a second reducer configured to drive the rotation of the driving loop in a reverse direction, the first reducer and the second reducer being positioned at opposite ends of the driving side; and
   at least one sprocket driven by the driving side of the driving loop and configured to drive a rotation of at least one roller of the roller conveyor in the forward direction when the driving loop is rotating in the forward direction, and in the reverse direction when the driving loop is rotating in the reverse direction;
   wherein the first reducer and the second reducer cooperate to drive the driving loop back and forth between the forward direction and the reverse direction in oscillation; and
   wherein the motor is configured to drive a rotation of an input shaft at a first rotation speed and in a first direction or in a second direction, wherein the first reducer and the second reducer are operatively coupled to and driven by the input shaft, wherein the first reducer drives the rotation of the driving loop in the forward direction when the input shaft is rotating in the first direction, and wherein the second reducer drives the rotation of the driving loop in the reverse direction when the input shaft is rotating in the second direction.

2. The drive system of claim 1, further comprising a main reducer driven by the input shaft and configured to drive an output shaft at a second rotation speed that is lower than the first rotation speed, wherein the output shaft drives the first reducer and the second reducer.

3. The drive system of claim 2, wherein the first reducer and the second reducer drive the rotation of the driving loop at a third rotation speed, and wherein the third rotation speed is equal to or lower than the second rotation speed.

4. The drive system of claim 3, wherein the at least one sprocket comprises a plurality of sprockets driven by the driving side of the driving loop, and wherein each of the plurality of sprockets drives the rotation of a roller of the roller conveyor.

5. The drive system of claim 4, wherein the driving side includes a forward end and a back end, wherein the first reducer is located near the forward end and pulls the driving side from the forward end to rotate the driving loop in the forward direction, and wherein the second reducer is located near the back end and pulls the driving side from the back end to rotate the driving loop in the reverse direction.

6. The drive system of claim 5, wherein a portion of the driving loop extending from the first reducer and across the driving side to the second reducer is tight, and wherein a slack side of the driving loop is located on the return side of the driving loop between the first reducer and the second reducer.

7. The drive system of claim 6, further comprising a tensioner on the return side.

8. The drive system of claim 6, wherein the roller conveyor is part of an automation cell having at least one downstream station.

9. The drive system of claim 8, wherein the drive system is controlled by a programmable logic controller, and wherein the programmable logic controller initiates the oscillation of the driving loop in response to a blockage at the at least one downstream station.

10. A roller hearth furnace for heating parts, comprising:
    a furnace having a housing defining a heating chamber;
    a plurality of rollers configured to convey the parts through the heating chamber; and
    a drive system for driving the plurality of rollers, the drive system including
      a motor,
      a driving loop driven by the motor and having a driving side and a return side,
      a first reducer configured to drive a rotation of the driving loop in a forward direction,
      a second reducer configured to drive the rotation of the driving loop in a reverse direction, and
      at least one sprocket driven by the driving side of the driving loop and configured to drive a rotation of at least one roller of the roller hearth furnace in the forward direction when the driving loop is rotating in the forward direction and in the reverse direction when the driving loop is rotating in the reverse direction;
    wherein the first reducer and the second reducer cooperate to drive the driving loop back and forth between the forward direction and the reverse direction in oscillation; and
    wherein the driving side includes a forward end and a back end, wherein the first reducer is located near the forward end and pulls the driving side from the forward end to rotate the driving loop in the forward direction, and wherein the second reducer is located near the back end and pulls the driving side from the back end to rotate the driving loop in the reverse direction.

11. The roller hearth furnace of claim 10, wherein a portion of the driving loop extending from the first reducer and across the driving side to the second reducer is tight, and wherein a slack side of the driving loop is located on the return side of the driving loop between the first reducer and the second reducer.

12. The roller hearth furnace of claim 11, wherein the at least one sprocket comprises a plurality of sprockets driven by the driving side of the driving loop, and wherein each of the plurality of sprockets drives the rotation of a roller of the roller hearth furnace.

13. The roller hearth furnace of claim 12, wherein the roller hearth furnace includes a plurality of drive sections each driven by the motor, and wherein each of the plurality of drive sections drives a group of the plurality of rollers.

14. The roller hearth furnace of claim 12, wherein the roller hearth furnace is part of an automation cell having at least one downstream station.

15. The roller hearth furnace of claim 14, wherein the drive system is controlled by a programmable logic controller, and wherein the programmable logic controller initiates the oscillation of the driving loop in response to a blockage at the at least one downstream station.

16. A method for driving an oscillation of rollers of a roller conveyor back and forth between a forward direction and a reverse direction, comprising:
   providing a drive system including a motor, a driving loop driven by the motor and having a driving side and a return side, and a first reducer and a second reducer on opposite sides of the driving side;
   oscillating an input shaft back and forth between a first direction and a second direction using the motor;
   rotating the driving loop in the forward direction with the first reducer when the input shaft is rotating in the first direction;
   rotating the driving loop in the reverse direction with the second reducer when the input shaft is rotating in the second direction; and
   driving the oscillation of the rollers with the driving loop, the rollers rotating in the forward direction when the driving loop is rotating in the forward direction, the rollers rotating in the reverse direction when the driving loop is rotating in the reverse direction.

* * * * *